Oct. 31, 1967   J. M. MADEY ETAL   3,350,034
SATELLITE APPENDAGE TIE-DOWN CORD
Filed Oct. 23, 1965   2 Sheets-Sheet 1

INVENTORS
ELMER W. TRAVIS
JESSE M. MADEY
BY
ATTORNEYS

Oct. 31, 1967   J. M. MADEY ETAL   3,350,034
SATELLITE APPENDAGE TIE-DOWN CORD
Filed Oct. 23, 1965                    2 Sheets-Sheet 2
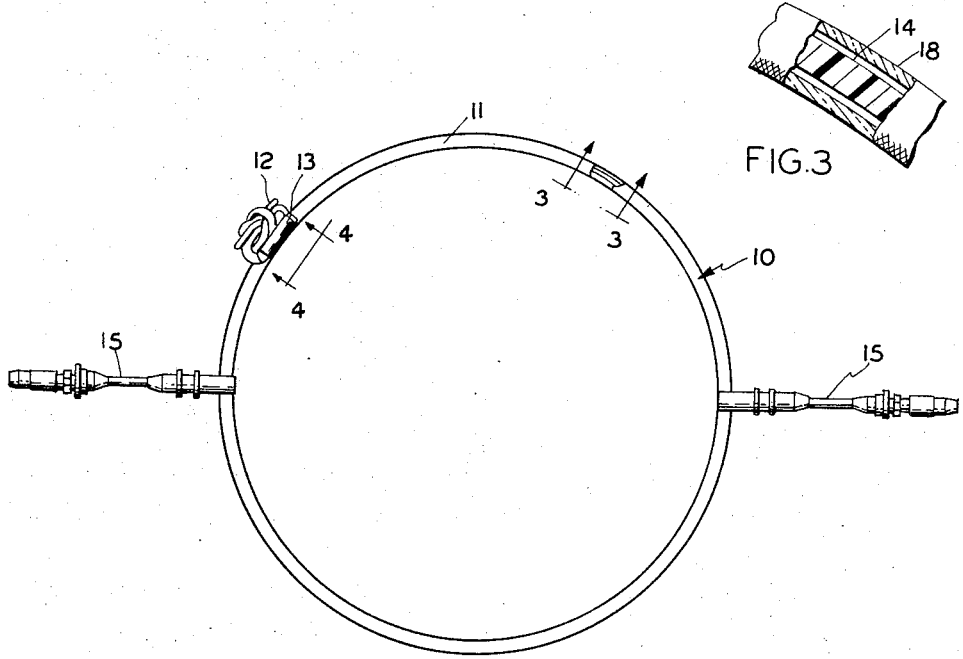
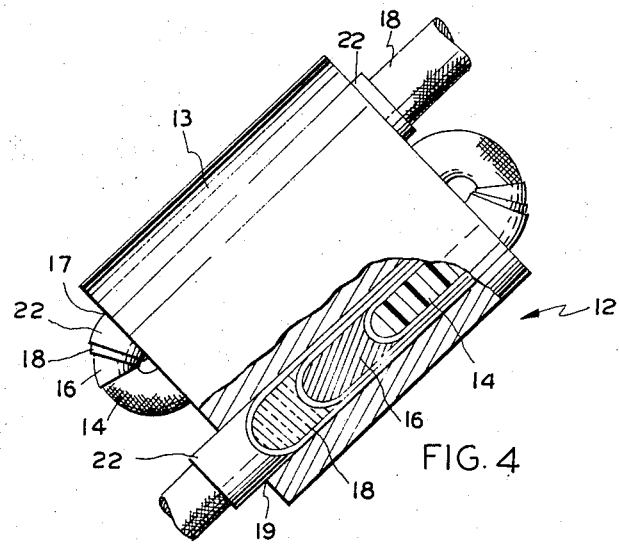
INVENTORS
ELMER W. TRAVIS
JESSE M. MADEY
BY
ATTORNEYS

United States Patent Office 3,350,034
Patented Oct. 31, 1967

3,350,034
SATELLITE APPENDAGE TIE-DOWN CORD
Jesse M. Madey, Hyattsville, and Elmer W. Travis, Clarksville, Md., assignors to the United States of America as represented by the Administrator of the National Aeronautics and Space Administration
Filed Oct. 23, 1965, Ser. No. 504,266
8 Claims. (Cl. 244—1)

ABSTRACT OF THE DISCLOSURE

A tie-down cable for spacecraft appendages having an elastic nylon cord within a fiberglass covering of slightly longer length to absorb, in the event of cord failure, circumferential expansion of the spacecraft rocket booster and maintain the appendages in a packaged condition.

---

The invention described herein may be manufactured and used by or for the Government of the United States of America for governmental purposes without the payment of any royalties thereon or therefor.

The present invention relates to a securing mechanism of a tie-down cord type for physically and mechanically securing or tying down the various appendages which may protrude or extend from a satellite or space-craft, and more particularly to a securing mechanism of this type that may be used to fasten space craft booms, solar paddles, and the like, to the surface or face of the last stage of a rocket booster so that tie-down of the appendages is established during the launch and the initial flight of the satellite and so that release thereof occurs at some time after the space-craft has left the atmosphere of the earth.

The prior art devices that have been commonly used for tie-down mechanisms have been nylon parachute cords, fiberglass ropes, or nylon cords reinforced at local or predetermined hot spots with fiberglass. The disadvantage of many of these prior art devices is that, in instances where they do have a desired elasticity, they are inherently limited by the fact that they tend to fail when they are subjected to extreme temperature conditions, such as approximately 200° F. Conversely, where the prior art devices may have a desired temperature quality, then they are not sufficiently elastic for stretching at such time as the last stage rocket booster expands in its circumferential dimension as a result of and due to internal pressure and temperature conditions that exist during the operation of the rocket booster.

A further disadvantage with many prior art tie-down devices is the absence of "fail-safe" features in that a portion thereof attains a temperature in the range of 400–500° F. due to any number of possibilities, such as the rocket booster case burning through in one spot or local excessively hot spots. Also encountered in the prior art devices is the difficulty of joining different types of cords together such as fiberglass types to nylon types. It has been observed that when two different types of cord materials are joined together, they are generally unreliable as a tie-down mechanism inasmuch as they are subjected to failure at the joint thereof in being exposed to high temperatures.

The present invention relates to a tie-down cable comprising a nylon cord housed within a woven, braided Teflon-treated fiberglass covering which is selected to be longer than the nylon cord. This cable is formed approximately into a circle or loop under tension about the last stage of the rocket booster with the ends thereof being joined together under compression by a copper retaining sleeve (Nicopress sleeve), so that the cable holds the appendages securely in place. Since the braided fiberglass sleeving is longer than the nylon cord, only the nylon cord is pre-loaded when the cable encircles the rocket booster and has its ends securely joined by the copper retaining sleeve. With the cable constructed in this manner, the rocket booster can expand several inches before the fiberglass covering carries any load at all. Explosive activated guillotine means cooperate with the cable to sever it at a predetermined time to thereby permit the appendages to be extended upon the release of the cable.

It is therefore an object of the present invention to provide an appendage tie-down mechanism that precludes premature erection of appendages.

It is another object of the present invention to provide a tie-down mechanism useful in retaining satellite appendages, and that can withstand high temperatures and yet be capable of possessing a high degree of elasticity.

It is a further object of the present invention to provide a satellite appendage tie-down mechanism that precludes premature erection of appendages and that possesses "fail-safe" features should abnormally high temperature or pressure conditions exist.

The above and other objects and advantages of the invention will become apparent upon full consideration of the following detailed description and accompanying drawings in which:

FIGURE 2 is a plan view of a preferred embodiment of the tie-down mechanism formed into a circle about the last stage of the rocket booster of FIGURE 1;

FIGURE 3 is an enlarged view of the cut-away portion taken along line 3—3 of the tie-down mechanism of FIGURE 2; and FIGURE 4 is an enlarged, partial cross-sectional view of the joint of the tie-down mechanism of FIGURE 2 taken along line 4—4 thereof.

Figure 1:
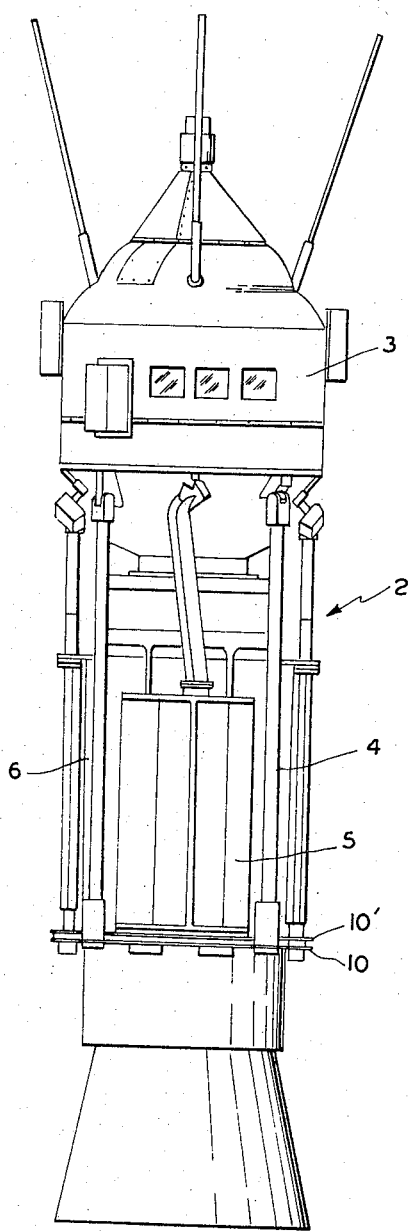
FIGURE 1 is an isometric view of a rocket booster and satellite combination with the satellite appendages retained to the booster by the tie-down mechanism of the present invention.

Referring now to the drawings, there is shown in FIGURE 1 a space vehicle 2 including a satellite 3 having booms 4 and solar paddles 5 affixed thereto, and a rocket booster 6 formed as an integral part therewith. Tie-down mechanisms 10 and 10' of the type shown in FIGURE 2 and described in more detail hereinafter, are used to hold booms 4 and solar paddles 5, respectively, against and alongside rocket booster 6 during the launch and powered flight of space vehicle 2.

Tie-down mechanism 10, as shown in FIGURE 2, comprises a cable 11 formed into a circle about the appendages to be tied down, such as the booms and/or solar paddles (not shown), and in which there is a joint 12 including a retaining sleeve 13 to connect the ends of cable 11. Two cutting devices 15 are positioned relative to cable 11 to sever the cable at a predetermined time.

Cable 11, as illustrated in FIGURE 3, is essentially a nylon cord 14 housed within a loose fitting, woven, braided, Teflon-treated, fiberglass covering 18. As used in FIGURE 1, and more clearly depicted in the cut-away portion showing of FIGURE 3, under normal operating conditions nylon cord 14 is held under tension by the compression action of retaining sleeve 13 at joint 12. On the other hand, the fiberglass covering 18, which is selected to be longer than the nylon cord 14 housed therewithin, is loosely fitted and under no tension.

Nylon cord 14, under ideal operating conditions of the space vehicle, serves to hold the appendages in place. However, as already explained above, under abnormal conditions, such as excessive temperature variations or booster case failures (burn through), the nylon cord could very well give and/or break, thereby releasing the appendages prematurely. When such a condition exists, the fiberglass covering, which has not been previously under tension and which can withstand up to approximately 1000° F., takes over to hold the appendages in place. By the cable 11 being constructed in this manner, a "fail-safe" feature is provided in the form of fiberglass covering 18. In addition, by fiberglass covering 18 being loosely fitted about nylon cord 14, the nylon cord is able to elongate or stretch as the casing of the booster expands due to heating and/or pressure during normal operating conditions. In other words, fiberglass covering 18 does not restrain the circumferential movement of nylon cord 14.

Fiberglass covering 18 also provides protection for nylon cord 14 by acting as a thermal insulator therefor. It is worthwhile to note that it is both braided and woven to provide extra strength and is treated with Teflon to reduce the friction between it and the appendages. Accordingly, it can be stated that during normal operation of tie-down mechanism 10, nylon cord 14 serves to hold the appendages against booster 6 and fiberglass covering 18 acts as a thermal insulation therefor and, at such time when abnormal conditions exist and nylon cord 14 fails, fiberglass covering 18 takes the place of the nylon cord and thereby prevents premature erection of the appendages.

FIGURE 4 illustrates an embodiment of the copper retaining sleeve 13 used in maintaining nylon cord 14 under tension and having two apertures 17, 19 therein, one for each end of cable 11 to pass through and be retained upon retaining sleeve 13 being swaged or crimped. In the use of this particular retaining sleeve, for example a Nicopress, it has been found that the most reliable grip is achieved when both ends of cable 11 are prepared as follows:

The fiberglass covering 18 is bunched up to expose the extremities of nylon cord 14. Then, an inner silicon rubber collar 16 is inserted between nylon cord 14 and fiberglass covering 18, and an outer silicon rubber collar 22 is placed over fiberglass covering 18. These two collars are chosen to have a length slightly longer than the length of the apertures within retaining sleeve 13 and diameters such that they can easily be formed with cable 11 and still, at the same time, form a snug fit therewith. In addition, the total diameter of cable 11, with the collars, must be such that cable 11, with the collars, can be inserted into apertures 17, 19 of retaining sleeve 13.

Collars 16 and 22 are used to enhance the friction fit of the various elements of cable 11 with the apertures of retaining sleeve 13 and also to assist in preventing the edges of retaining sleeve 13 from rupturing or cutting fiberglass sleeve 18.

Once both ends of cable 11 are prepared in the manner just described, they are inserted in apertures 17, 19 as shown, and the extremities of nylon cord 14 are pulled so that nylon cord 14 is put under tension. Then retaining sleeve 13 is crimped so that those portions of cable 11 within apertures 17, 19 are gripped tightly and prevented from moving. Finally, the exposed extremities of nylon cord 14 are tied together into a square knot which, in conjunction with retaining sleeve 13, forms joint 12.

In summary, it can be stated that tie-down mechanism 10, because of nylon cord 14 being elastic, compensates for the expansion of rocket booster 6 about which it is disposed, due to variations in temperature and pressure when the space vehicle is in launch and flight phase. On the other hand, should nylon cord 14 fail for any reason whatsoever, then the appendages will open very slightly and fiberglass covering 18 will take over to restrain these appendages from erecting. Accordingly, fiberglass covering 18 provides the "fail-safe" feature for the tie-down mechanism 10.

At a predetermined time and just prior to the separation of satellite 3 from booster stage 6, cutting devices 15 sever cable 11, thereby permitting release of solar cell paddles 5 and booms 4 so that they can assume their desired position relative to the satellite. It should be understood that while two cutting devices 15 are shown in FIGURE 2, the same result can be achieved with one. The second cutting device is included as an added insurance feature.

While the tie-down mechanism 10 has been described as generally having an inner nylon cord 14 and an outer fiberglass covering 18, it should be noted that the cord can be of any one of a number of materials which are elastic and can withstand such temperature and pressure conditions as are associated with rocket boosters in flight, and the covering can likewise be of a material that has strength and can withstand rather abnormally high temperature and pressure conditions as are concerned with rocket boosters in flight.

It should be understood that various changes in the details, materials, steps and arrangement of parts, which have been described and illustrated to explain the nature of the invention, may be made by those skilled in the art within the principle and scope of the invention as expressed in the appended claims.

What is claimed is:

1. A tie-down system for restraining various appendages of a space vehicle against the surface of a rocket booster attached thereto, comprising: an elastic cord of sufficient length to fit around the circumference of said booster, a woven, braided, Teflon-treated fiberglass covering adapted to overlie said elastic cord and being slightly longer in length than said elastic cord when said cord is in its unloaded condition, and a retaining means for joining the ends of said elastic cord and the ends of said fiberglass covering into a composite joint such that said outer fiberglass covering is under conditions of no load, while said elastic cord is pre-loaded.

2. The tie-down system of claim 1 wherein said elastic cord is nylon.

3. A tie-down system for restraining satellite booms and solar paddles to a rocket booster comprising: a cable having an elastic cord of nylon adapted in length to fit around the circumference of said rocket booster, and a woven, braided, fiberglass covering overlying said elastic cord, said fiberglass covering being treated with Teflon to reduce friction between said fiberglass covering and said booms and solar paddles; an inner shrinkable collar positioned between said elastic cord and said fiberglass covering at the ends of said cable; an outer shrinkable collar positioned about said fiberglass covering in the vicinity of said inner shrinkable collar and having a length substantially that of said inner shrinkable collar; and a retaining means having a length slightly smaller than said collars and having a pair of longitudinal apertures therein, each being adapted to have an end of said cable to pass therethrough and to be compressed so as to join the two ends of said cable whereat said shrinkable collars are positioned so that said elastic cord is pre-loaded while said fiberglass cover is under a no-load condition.

4. A tie-down mechanism for restraining various appendages of a space vehicle to a rocket booster until such predetermined time as when said appendages are to be extended, comprising: a cable having an elastic cord member that can withstand such temperature and pressure conditions as are generally associated with said rocket booster in flight, and a strong covering material loosely surrounding the length of said cord member and capable of withstanding rather abnormally high temperature and pressure conditions as exist when said rocket booster is in flight, said covering material being slightly longer than said elastic cord member when said cord member is in its unstretched condition.

5. The tie-down mechanism of claim 4 further including a means for joining the ends of said cable such that said elastic cord member is pre-loaded and said covering material is under a no-load condition.

6. The tie-down mechanism of claim 5 further including a cutting means associated therewith for severing said cable at said such predetermined time.

7. A tie-down means comprising a cable having an elastic inner member and an outer temperature-resistant, essentially non-elastic covering member surrounding said inner member and extending slightly beyond the length of said inner member when said inner member is in its unloaded condition; and a retaining means for tightly gripping the ends of said cable and forming a joint such that said inner member is pre-loaded and said covering is under a no-load condition.

8. A method of forming a tie-down mechanism of a cable type for restraining satellite appendages to a rocket booster, wherein said cable includes an elastic cord surrounded by a woven fiberglass covering slightly longer than said elastic cord, said method comprising the steps of: bunching said covering to expose the extremities of said cord, inserting an inner shrinkable collar between said cord and said covering substantially at each of the ends of said cable, placing an outer shrinkable collar over said cover at each of said ends of said cable and substantially coaxial with said inner collar thereat, inserting said ends of said cord through apertures in a retaining member such that said collars are contained in and extend slightly out of said apertures, and crimping said retaining member to tightly grip said ends of said cable.

References Cited

UNITED STATES PATENTS

| | | | |
|---|---|---|---|
| 2,712,509 | 7/1955 | Biefeld | 57—140 |
| 2,768,925 | 10/1956 | Fay | 57—140 |
| 3,047,259 | 7/1962 | Tatnall et al. | 244—1 |
| 3,078,755 | 2/1963 | Chace | 87—6 |

FERGUS S. MIDDLETON, *Primary Examiner.*